Feb. 2, 1954 W. J. FITZSIMMONS 2,668,067
RUBBER SEAL
Filed July 11, 1950

Inventor
WILLIAM J. FITZSIMMONS

Patented Feb. 2, 1954

2,668,067

UNITED STATES PATENT OFFICE 2,668,067

RUBBER SEAL

William J. Fitzsimmons, Chicago, Ill.

Application July 11, 1950, Serial No. 173,091

3 Claims. (Cl. 286—6)

This invention relates to rubber seals adapted particularly for use in the journal boxes of railway passenger cars, freight cars and the like. More particularly, the invention relates to a rubber seal adapted to be disposed about the axle of a railway car for sealing the aperture between said axle and a journal box within which an end of the axle is inserted in order to keep foreign matter from entering within, but still to allow accumulated moisture within the box to escape.

According to the present invention, a journal box for a railway car has the end portion of an axle extending therein through an aperture in the box. The rubber seal of this invention is disposed about the axle in slidable sealing relation therewith and is retainingly engaged in sealing relation within the journal box about the aperture. In order to permit the escape of accummulated moisture from within the journal box, but still to effect a tight enough seal to prevent the entry of foreign matter into said box, the upper portion of the seal is provided with narrow, baffled vents.

The sealing between the rubber seal and the axle is accomplished by means of a deformable flange formed about an opening through the seal, said opening having its nominal diameter slightly smaller than the diameter of the axle to be received within the opening. For effecting a sealing engagement with the journal box, the seal is provided with a pair of parallel outer peripheral flanges extending around the entire outer periphery of the seal except for the upper portion containing the vents. The flanges are retained in sealing engagement about the aperture through the journal box by means of a flange within the box and extending therearound. This flange retains the outer peripheral flanges of the seal against the inner side of the apertured end of the journal box.

The narrow, baffled vents are provided by cutting away non-adjacent portions of the pair of upper peripheral seal flanges. The main body of the seal is provided with the requisite stiffness by means of a metal plate imbedded within the rubber-like material of the body portion.

It is, therefore, an important object of the present invention to provide a journal box seal for a railway car which contains baffled vents to permit the escape of accumulated moisture within the journal box, but which will prevent the entry of foreign matter therein, and at the same time will prevent the loss of lubricant from the journal box.

Another object of the present invention is to provide a vented railway journal box seal which contains a metallic liner for lending stiffness to the body of the seal.

A further object of this invention is to provide a vented seal for a railway journal box which is radially self-aligning, but which still provides adequate sealing for preventing the loss of lubricant from the journal box and for preventing the entry of foreign matter therein.

Still another object of this invention is to provide a seal for a railway journal box through which an axle may be easily inserted and which will provide a tight and yet long wearing peripheral seal about the axle.

A specific object of the present invention is to provide a seal for a railway journal box having an aperture therethrough to receive an axle in sealing engagement therearound and having outer peripheral flanges for continuous sealing engagement with the journal box around an aperture therethrough, said flanges having non-adjacent cut-away portions at the top portion of the seal for providing narrow, baffled vents from the journal box to the outer atmosphere.

Other objects, features and advantages of the present invention will be readily apparent from the following detailed description of a preferred embodiment thereof taken in conjunction with the accompanying one sheet of drawings in which.

As shown on the drawings.

Figure 1:
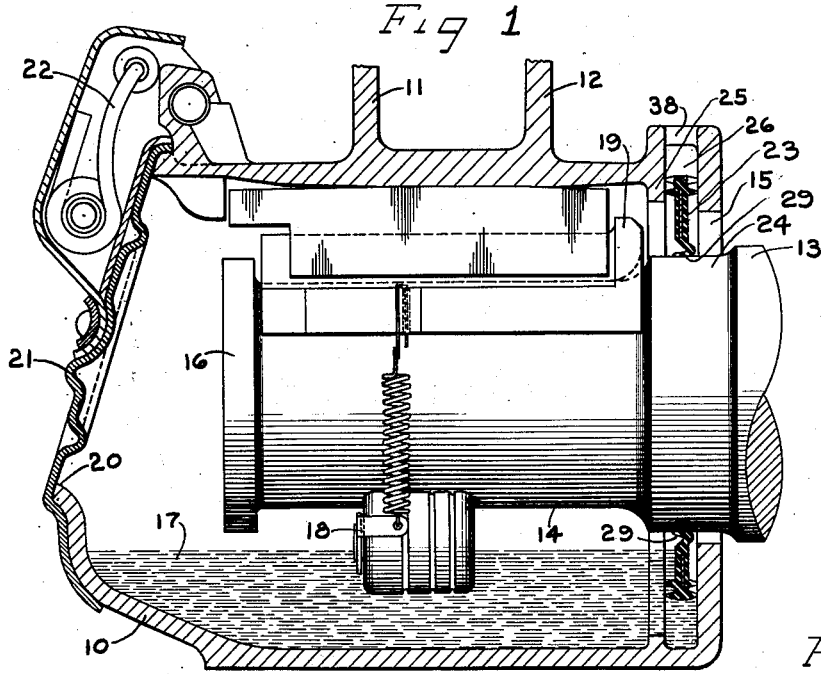
Figure 1 is a side elevational view with parts in section of a railway car journal box containing the end portion of an axle and having a rubber seal of the present invention installed therein.
Figure 2:
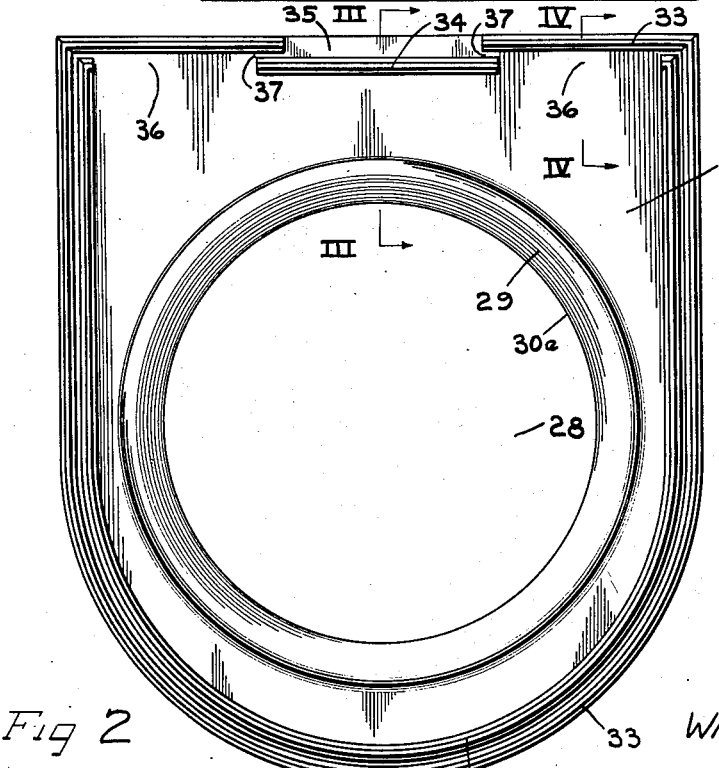
Figure 2 is an enlarged elevational view of one face of a rubber seal according to the present invention.
Figure 3:
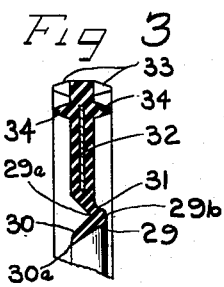
Figure 3 is a fragmentary sectional view taken substantially along line III—III of Figure 2.
Figure 4:
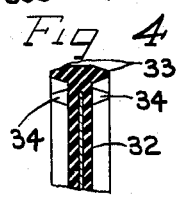
Figure 4 is a fragmentary sectional view taken substantially along line IV—IV of Figure 2.

In Figure 1 a journal box 10 having supporting members 11 and 12 for attachment of the box to a railway car is shown with an axle 13 having a journal 14 extending therein through an aperture 15 at one end of the journal box 10. The journal 14 is of smaller diameter than the axle 13 and has an annular flange 16 formed at its outer end which is also the end of the axle 13. The lower portion of the journal box 10 contains a pool of lubricant 17 therein. A journal lubricator assembly 18, partly immersed in the pool of lubricant 17, is adapted to apply lubricant to the journal 14. A bearing assembly 19 is disposed in bearing relation about the upper portion of the journal 14 and serves to transmit the weight of the railway car from the supporting members 11 and 12 through the bearing assembly and the journal 14 to the axle 13 and to railway wheels attached thereto (not shown) which rest on the track.

At the end of the journal box 10 opposite to the aperture 15 is provided an access opening 20 which has an access cover assembly 21 having locking means 22 for retaining the cover assembly in closing position. The access opening 20 can be opened by raising the cover assembly 21 for the purpose of inspecting, replacing, or repairing the parts contained within the journal box 10.

In order to allow excess moisture within the journal box 10 to escape, but at the same time to prevent the loss of lubricant and to prevent foreign matter from entering within the box, a seal 23 of rubber-like, lubricant-resisting material is provided to close the gap left between the axle and the edge of the aperture 15. The seal 23 fits tightly yet slidably about the periphery of a short section 24 of the axle 13 of slightly less diameter than the main portion of the axle and located adjacent the axially inward end of the journal 14. This section 24 is referred to in the art as the dust collar. The outer periphery of the seal 23 is retained tightly against the inner surface of the end of the journal box 10 by a substantially continuous flange 25 which is integrally formed around the inner surface of the journal box 10, thereby forming a substantially continuous recess 26 between the flange 25 and the inner face of the apertured end of the journal box 10.

The seal 23 has a substantially flat body member 27 of substantially closed U-shaped pattern, conforming generally to the cross-sectional shape of the journal box 10. Along its vertical center line the body member 27 contains a comparatively large circular opening 28 defined by a deformable marginal portion 29. The marginal portion 29 comprises a deformable radially and axially inwardly directed tapered lip 30 of less thickness than the body member 27 and at an angle to the plane defined by the same. The radially inwardly directed margin of the lip 30 terminates in a sharp edge 30a. The lip 30 is integrally attached to the body member 27 by means of a web 31 also at an angle to the plane defined by the body member and at an angle to the lip 30. Specifically the web 31 extends radially inwardly and axially outwardly of the body member 27. Thus, a V-shaped groove 29a is formed between the lip 30 and the web 31.

The material of the body member surrounding the marginal portion 29 is thickened to provide a rounded circular boss 29b which facilitates entry of the dust collar portion 24. In some cases relative movement of the axle is such that the portion 24 may move out of the opening 28. In that event the boss 29b effects a seal with the vertical shoulder between the portions 24 and 14. In addition, such axial play of the axle 13 serves to lubricate the dust collar 24 to minimize wear of the marginal portion 29.

It will be understood that when the end of the axle 13 is inserted into the opening 28, the lip 30 is deformed radially outwardly and is disposed in tight sealing engagement about the periphery of the short section 24. The V-shaped groove 29a is narrowed but not closed so that the free edge of the lip 30 will bear against the section 24 partly because of a cantilever bending force and partly because of a peripheral stretching of the lip. Because the lip is directed axially inwardly terminating at the sharp edge 30a which is in continuous peripheral contact with the short section 24, a highly efficient seal is effected and the radial contacting force need not be very great to maintain proper sealing. Consequently, the lip 30 will wear very slowly and what little wear does occur will be automatically compensated for due to the resilience of the V-shaped marginal portion.

In order to stiffen the body member 27 a metallic plate 32 is completely imbedded within the material of the body. The plate 32 is of the same general pattern as the body member 27, but has smaller outside marginal dimensions and a larger inside marginal diameter permitting the plate to be completely surrounded by the rubber-like material of the body member.

About the outer peripheral portion of the body member 27 a pair of wedge-shaped substantially parallel ribs 33 and 34 are integrally formed at substantially 90° to the body member 27 at each side thereof. The outer ribs are numbered 33 and the inner ribs 34. The outer ribs 33 extend substantially continuously around the outer periphery of the body member 27, but contain cut-out portions 35 along the upper periphery of the body member 27, the cut-outs extending for about one-third of the distance across the upper periphery and being centered relative to the vertical axis of the body. The inner ribs 34 also extend substantially continuously around the periphery of the body member 27, but contain a pair of cut-out portions 36 on each side of the body, the cut-outs 36 being non-adjacent to the cut-outs 35. Hence, a pair of narrow, baffled vents 37 are provided on each side of the body member 27. For providing an access opening from the recess 26 to the outer atmosphere and for providing an opening for inserting the seal into the recess a slot 38 is formed through the top of the journal box 10 between the flange 25 and the inward face of the apertured end. It will be understood that vented moisture can be discharged through the slot 38 or back through the vents 37 on the other side of the seal and out through the aperture 15 around the axle 13.

It is readily apparent that when the seal 23 has its outer periphery disposed within the recess 26 within the journal box 10, the ends of the ribs 33 and 34 are sealingly engaged against the opposed faces of the flange 25 and the apertured end of the journal box 10. When the axle 13 is inserted into the journal box 10 through the aperture 15 and the opening 28, the lip 30 of the marginal portion 29 of the seal 23 is displaced radially outwardly to bear in tight sealing engagement against the periphery of the short section 24. Since the seal 23 is not fixedly engaged within the recess 26, it will be aligned radially in accordance with the radial location of the axle 13 and will remain aligned thereabout regardless of any radial movement of the axle due to wear on the bearing, etc.

Under many conditions of operation the interior of the journal box 10 will tend to accumulate excessive moisture due to deterioration of the lubricant 17 and due to the moisture ordinarily entrapped within the new lubricant which is supplied within the journal box. According to the present invention, any excessive moisture within the journal box 10 will be discharged into the outer atmosphere through the vent 37. However, due to the baffled arrangement of the vent 37 foreign matter falling into the upper portion of the recess 26 cannot readily enter the journal box 10. Since the venting arrangement shown is located at the top of the seal 23, the substantially continuous ribs 33 and 34 will effectively prevent foreign matter from entering within the journal box 10 in a like manner.

From the following description it will be understood that the present invention provides a novel rubber seal for railway journal boxes in order to prevent the entry of foreign matter into the journal box and to prevent the loss of lubricant therefrom. The seal, though tightly engaged about the axle and within the journal box, is radially self-aligning to permit easy installation and to allow for wear in the bearing within the journal box. An extremely simple and novel venting arrangement is provided at the top portion of the seal for discharging excessive moisture from within the journal box to the outer atmosphere.

It will be understood that modifications and variations may be effected without departing from the scope of the novel concepts of the present invention.

I claim as my invention:

1. In a journal box assembly having an axle with a journal portion extending into the journal box through an aperture therein, a seal disposed about said axle and in slidable sealing engagement therewith, and a plurality of substantially continuous ribs about the outer peripheral portion of said seal, said ribs being disposed in sealing contact with said journal box adjacent the aperture therein, said ribs having non-adjacent cut-out portions at the top of said seal to form narrow, baffled vents from said journal box to the outer atmosphere.

2. In a journal box assembly having an axle with a journal portion extending into the journal box through an aperture therein, a seal of rubber-like lubricant resisting material comprising a substantially flat body member having a relatively large opening therethrough, said opening being defined by a deformable marginal portion therearound, said deformable marginal portion being disposed in slidable sealing engagement about the axle, a plurality of substantially continuous ribs integral with said body member and extending around the bottom and sides of said opening through said body member, and ribs extending across the top of said body member above said opening therethrough, said ribs extending substantially perpendicularly to said body member and being disposed in sealing, radially displaceable contact with said journal box adjacent the aperture therein, said ribs across the top of said body member having non-adjacent cut-out portions to form baffled vents from the journal box to the outer atmosphere.

3. A seal for a railway journal box comprising a substantially flat body member of rubber-like lubricant-resistant material having a relatively large circular opening therethrough, a substantially flat metallic plate embedded within the material of the body member, the opening through said body member being defined by a deformable marginal portion therearound, said deformable margin comprising an annular boss protruding axially outwardly from the plane of the body member and a resilient annular lip integral with said boss and extending radially and axially inwardly from said boss, said boss being connected with said body member by means of a generally axially outwardly extending web portion integral with said body member and with said boss, a plurality of substantially continuous ribs integral with said body member and extending about the major portion of said opening, and ribs extending across the top of said opening and having non-adjacent cut-out portions to form a baffled vent from said journal box to the outer atmosphere.

WILLIAM J. FITZSIMMONS.

References Cited in the file of this patent

UNITED STATES PATENTS

| Number | Name | Date |
|---|---|---|
| 1,989,110 | Penniman | Jan. 29, 1935 |
| 2,012,974 | Penniman | Sept. 3, 1935 |
| 2,165,102 | Kimball | July 4, 1939 |
| 2,233,902 | Schmied | Mar. 4, 1941 |
| 2,487,669 | Pattullo et al. | Nov. 8, 1949 |